(No Model.)

G. P. DODGE.
WEATHER STRIP.

No. 378,778. Patented Feb. 28, 1888.

WITNESSES:

INVENTOR.
George P. Dodge
BY
ATTORNEYS.

United States Patent Office.

GEORGE P. DODGE, OF GREAT NECK, NEW YORK.

WEATHER-STRIP.

SPECIFICATION forming part of Letters Patent No. 378,778, dated February 28, 1888.

Application filed December 16, 1887. Serial No. 258,087. (No model.)

*To all whom it may concern:*

Be it known that I, GEORGE P. DODGE, of Great Neck, in the county of Queens and State of New York, have invented certain new and useful Improvements in Weather-Strips, of which the following is a specification.

The object of my invention is to provide a new and improved weather-strip which is simple in construction, effective in use, and can be produced at a comparatively low cost.

The invention consists in a weather-strip composed of an elastic cord or tubing held between a doubled strip of fabric, oil-cloth, leather, or like material, the two layers of the said material being cemented together.

Figure 1:
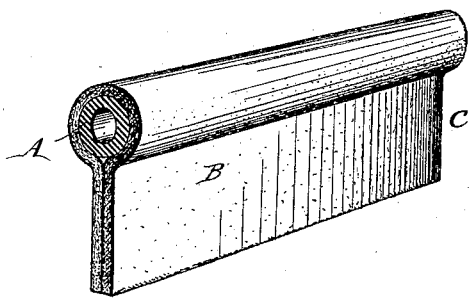
Figure 2:
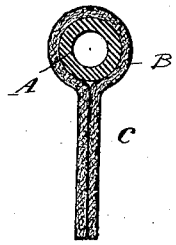

In the accompanying drawings, Figure 1 is a perspective view of a piece of my improved weather-strip. Fig. 2 is a cross-sectional view of the same.

Similar letters of reference indicate corresponding parts.

The rubber tubing A is placed centrally and longitudinally on a strip, B, of cloth, felt, leather, oil-cloth, or like material, which is doubled over said tubing, and the two adjacent faces of said doubled strip B are then united by means of rubber cement or any other suitable adhesive material, so as to form a flange, C, for said rubber tubing, which is thus held at the closed edge of said doubled strip. In place of the said rubber tubing a solid rubber or other elastic cord may be used.

The weather-strip is fastened to the door or windows or their casing by means of tacks driven through the flange C, or by means of rubber cement or other suitable adhesive material.

My improved weather-strip is very durable, produces tight joints, can be painted to match the wood-work, and is not expensive.

Having thus described my invention, I claim as new and desire to secure by Letters Patent—

A weather-strip composed of an elastic tubing or cord held in a doubled strip of cloth, leather, or like material along the closed edge of said doubled strip, the two adjacent faces of said doubled strip being united by adhesive material, substantially as herein shown and described.

In testimony that I claim the foregoing as my invention I have signed my name in presence of two subscribing witnesses.

GEO. P. DODGE.

Witnesses:
 A. J. LE CLAIR,
 WM. A. DALE.